United States Patent
Hampton et al.

(10) Patent No.: US 11,816,730 B2
(45) Date of Patent: Nov. 14, 2023

(54) LOW-LATENCY TRADING PLATFORM AND COMMUNICATIONS SYSTEM

(71) Applicant: CHARTER COMMUNICATIONS OPERATING, LLC, St. Louis, MO (US)

(72) Inventors: Alec Hampton, Centennial, CO (US); Elliott Hoole, Parker, CO (US); Diwelawatte P. Jayawardene, Centennial, CO (US); Ramneek S. Bali, Aurora, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 233 days.

(21) Appl. No.: 16/925,530

(22) Filed: Jul. 10, 2020

(65) Prior Publication Data
US 2022/0012805 A1   Jan. 13, 2022

(51) Int. Cl.
| | |
|---|---|
| G06Q 40/04 | (2012.01) |
| G06Q 20/40 | (2012.01) |
| H04L 41/50 | (2022.01) |
| H04L 41/5022 | (2022.01) |
| H04L 67/2895 | (2022.01) |
| H04L 41/5051 | (2022.01) |

(Continued)

(52) U.S. Cl.
CPC ........... *G06Q 40/04* (2013.01); *G06Q 20/405* (2013.01); *H04L 41/5022* (2013.01); *H04L 41/5051* (2013.01); *H04L 41/5077* (2013.01); *H04L 67/2895* (2013.01); *H04L 67/5651* (2022.05); *H04L 67/01* (2022.05)

(58) Field of Classification Search
CPC ............................... G06Q 40/00; G06Q 40/04
USPC ........................................................ 705/38
See application file for complete search history.

(56) References Cited

U.S. PATENT DOCUMENTS

| | | | | |
|---|---|---|---|---|
| 5,761,442 A | * | 6/1998 | Barr ...................... | G06Q 40/02 705/36 R |
| 6,026,381 A | * | 2/2000 | Barton, III .............. | G06F 16/35 707/E17.089 |

(Continued)

*Primary Examiner* — Kirsten S Apple
(74) *Attorney, Agent, or Firm* — Patent Beach PC

(57) ABSTRACT

Various embodiments comprise systems, methods, architectures, mechanisms and apparatus providing a low-latency trading platform and/or communications system wherein one or more remote client devices communicate with a proxy server via a first communications channel, the proxy server being tightly coupled to (co-located and directly communicating with) a programmable hardware platform configured to communicate with an equities exchange system via a second communications channel, the location of the proxy server and hardware platform being proximate that of at least one equities exchange system, wherein the proxy server is updated by client device communications defining trade execution profiles associated with each of a plurality of equities and corresponding trading strategies, and wherein the hardware platform executes equity trades in response to substantially real time data received from the equities exchange. Various embodiments provide a mechanism for automatically provisioning the communications system in accordance with an Infrastructure as a Service (IAAS) offering from a provider of network services.

20 Claims, 4 Drawing Sheets

(51) Int. Cl.
*H04L 67/5651* (2022.01)
*H04L 67/01* (2022.01)

(56) References Cited

U.S. PATENT DOCUMENTS

| | | | | |
|---|---|---|---|---|
| 6,996,539 | B1* | 2/2006 | Wallman | G06Q 40/06 705/37 |
| 7,181,423 | B2* | 2/2007 | Blanchard | G06Q 40/06 705/37 |
| 7,908,206 | B2 | 5/2011 | Waelbroeck et al. | |
| 8,494,952 | B2 | 7/2013 | Claus et al. | |
| 8,756,142 | B1 | 6/2014 | Keiser et al. | |
| 10,467,694 | B2 | 11/2019 | Katsuyama et al. | |
| 10,699,336 | B2* | 6/2020 | Burkhardt | G06Q 30/08 |
| 2007/0299758 | A1* | 12/2007 | Zosin | G06Q 40/06 705/36 R |
| 2008/0084833 | A1* | 4/2008 | Picard | H04B 1/7143 370/280 |
| 2010/0226455 | A1* | 9/2010 | Porat | H04B 7/0417 375/267 |
| 2015/0127513 | A1* | 5/2015 | Studnitzer | G06Q 40/04 705/37 |
| 2015/0127516 | A1 | 5/2015 | Studnitzer et al. | |
| 2018/0276753 | A1 | 9/2018 | Callaway et al. | |
| 2019/0276299 | A1 | 10/2019 | Mortimer et al. | |
| 2020/0027165 | A1 | 1/2020 | Studnitzer et al. | |

* cited by examiner

LOW-LATENCY TRADING PLATFORM AND COMMUNICATIONS SYSTEM

FIELD OF THE DISCLOSURE

The present disclosure generally relates to communications systems and, in particular, to a low-latency trading platform and communications system.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

While the various financial markets are largely dominated by large institutional traders utilizing computer-based high-frequency trading (HFT) strategies, opportunities continue to exist for individual retail traders to make significant profits. Retail traders in-general, and career day traders specifically, are able to compete with large hedge funds and sophisticated automated trading systems thanks to certain built-in advantages. Other factors, however, can limit an individual trader's profitability relative to that of a technology-augmented strategy.

Specifically, day traders, high-frequency traders and the like benefit from equity market volatility against which they trade (entering and/or exiting equity positions) in accordance with a particular strategy. Such traders require speed of execution, which is limited by the frequent need to enter/exit equity positions manually (i.e., not in a predefined or programmatic manner), as well as by the unavoidable delay between the time that an order is placed and the time that the order is executed or filled.

This delay is the result of the overhead involved in placing orders through brokerages, as well as the geographical separation between the trader, the broker, and ultimately, the exchange. Although such delays may be measured in seconds or even fractions of seconds for experienced traders, they can make all the difference. In a typical trading scenario, decisions must be made and orders must be placed based on information which is always at least slightly out of date, and which will become even less current by the time the order reaches the exchange. Additionally, these delays further limit traders by effectively enforcing the necessity to place so-called "limit" orders rather than simple market orders, which only further expands the time necessary to match with a buyer/seller, and ultimately, to fill the order.

Unfortunately, currently deployed trading platforms, systems, and computing/communications architectures exhibit various technical deficiencies that negatively impact non-institutional traders.

SUMMARY

Various deficiencies in the prior art are addressed by systems, methods, architectures, and services providing a low-latency trading platform and/or communications system wherein one or more remote client devices communicate with a proxy server via a first communications channel, the proxy server being tightly coupled to (co-located and directly communicating with) a programmable hardware platform configured to communicate with an equities exchange system via a second communications channel, the location of the proxy server and hardware platform being proximate that of at least one equities exchange system, wherein the proxy server is updated by client device communications defining trade execution profiles associated with each of a plurality of equities and corresponding trading strategies, and wherein the hardware platform executes equity trades in response to substantially real time data received from the equities exchange. Various embodiments provide a mechanism for automatically provisioning the communications system in accordance with an Infrastructure as a Service (IAAS) offering from a provider of network services.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
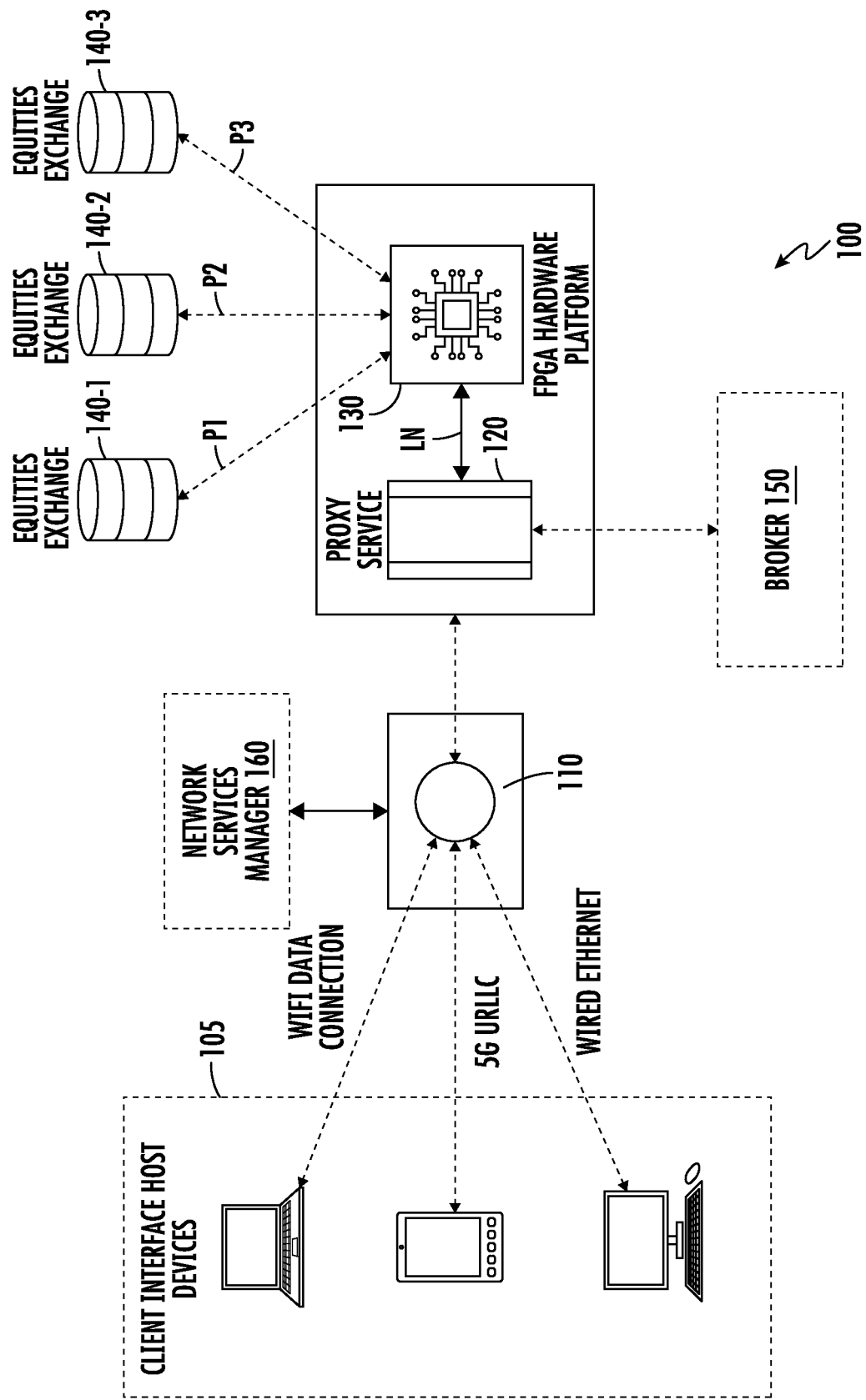
FIG. 1 graphically depicts a system according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

The various embodiments provide a system configured to provide low-latency decision-making and trading execution by automating decision making via hardware and a combination of hardware and software, and to do so at close physical proximity to a data center(s) associated with an equity exchange or other financial services/products exchange. By operating as close as possible to the exchange itself, the various embodiments enable decision-making on near-real time data as well as trade execution based upon processing such data with as little latency as possible. Additionally, various embodiments primarily consist of single-purpose dedicated hardware such that these embodiments may operate without much of the overhead that general-purpose computing platforms require.

Various embodiments provide a computer-implemented high-speed trade execution system and method wherein one or more remote client devices communicate with a proxy server via a first communications channel, the proxy server being tightly coupled to (co-located and directly communicating with) a programmable hardware platform configured to communicate with an equities exchange system via a second communications channel, the location of the proxy server and hardware platform being proximate that of at least one equities exchange system, wherein the proxy server is updated by client device communications defining trade execution profiles associated with each of a plurality of equities and corresponding trading strategies, and wherein the hardware platform executes equity trades in response to substantially real time data received from the equities exchange.

Various embodiments provide a communications system supporting a high-speed trade execution system and method wherein one or more remote client devices communicate with a proxy server via a first communications channel, the proxy server being tightly coupled to (co-located and directly communicating with) a programmable hardware platform configured to communicate with an equities exchange system via a second communications channel, the location of the proxy server and hardware platform being proximate that of at least one equities exchange system, wherein the proxy server is updated by client device communications defining trade execution profiles associated with each of a plurality of equities and corresponding trading strategies, and wherein the hardware platform executes equity trades in response to substantially real time data received from the equities exchange.

Various embodiments provide a mechanism for automatically provisioning the communications system in accordance with an Infrastructure as a Service (IAAS) offering from a provider of network services.

FIG. 1 graphically depicts a system according to an embodiment. Specifically, the system 100 comprises, end-to-end, one or more Client Interface Host Devices (CIHDs) 105 (e.g., client computing/communications devices such as computers, mobile phones, tablet computers and the like) configured to communicate via a first communications channel(s) with a Proxy Service (PS), illustratively implemented via a high performance computing device (e.g., web server) 120. The high performance server 120 is co-located and in high speed communication with a Hardware Platform (HP) 130, illustratively implemented via one or more of a field programmable gate array (FPGA), an application-specific integrated circuit (ASIC), a Complex Programmable Logic Devices (CPLD), and/or other programmable hardware platform(s), device(s) or integrated circuit(s). The Hardware Platform 130 and high performance server 120 are co-located and in direct physical connection/communication with each other. The Hardware Platform 130 is geographically proximate one or more equities/securities exchanges 140, illustratively data centers associated with the one or more equities/securities exchanges 140, and configured to communicate thereto via second (high priority, low latency) communications channel(s).

The Client Interface Host Devices 105 are a primary means to configure various aspects of the system 100, trigger the execution of orders, perform research and so on. Each CIHD 105 provides a means by which an equities trader may configure a "watch list" on a regular (e.g., daily) basis and define one or more execution profiles which, in response to substantially real-time equities-related data, perform sequence(s) of one or more trades.

Client-Server Data Transmission

Each CIHD 105 communicates with a proxy service PS implemented at a computing device/server 120 via a first communications network 110, such as an access network, backbone network or some other communications network or combination thereof. Messages between the CIHDs 105 and proxy service PS are transmitted via, illustratively, a QUIC transport layer protocol in order to minimize latency. A CIHD 105 operating without a hardwired network connection may use communications links/channels such as Ultra-Reliable Low Latency Communication (URLLC) in a Fifth Generation (5G) mobile network.

In various embodiments, encoded payloads are used to provide shorter messages, additional security and so on. For example, in addition to a session ID or authentication token and the like (i.e., suitable means to authenticate user and verify that the message is valid), an exemplary payload message requesting an order may be formed as follows: {03:0:7:800:05}. Each of the colon-separated values corresponds to a specific data field relevant for placing or triggering a trade, such as the following: (1) an equity identifier such as a two-digit code corresponding to one of the hardware profile configured watchlist equities or financial instruments; (2) an order identifier, such as a "0" to indicate a sell order or a "1" to indicate a buy order; (3) an order type identifier, such as a single-digit code corresponding to the order type (market, limit, stop limit, etc.); (4) a transaction volume indicator, such as a number of shares/units to purchase/sell; and (5) a transaction strategy indicator, such as a two-digit code corresponding to the intended strategy for this transaction, wherein the transaction strategy indicator is associated with a transaction strategy previously configured at the hardware platform via the hardware platform programming data. In this manner, a specific trade request may comprise a message including sufficient information to trigger a trade in a manner consistent with a stored transaction strategy, but configured to provide this information in a manner reducing an amount of data to be transported by the first communication channel.

Any transaction strategy may be programmed into the hardware platform, along with the various entry and exit price points, momentum indicators, resistance level indicators, price barriers, and so on. Transaction strategies may include known techniques such as breakout strategies, momentum strategies, scalping strategies, reversal strategies and so on. The transaction strategy is programmed into the hardware platform and executed in accordance with pricing data, volume data and other data received from an exchange, other data from other resources (e.g., news headlines, scheduled release times for market moving information and the like). The transaction strategy may be inhibited in whole or in part, optionally with results tracking enabled to test the strategy or parts thereof, or enabled in whole or in part to execute the strategy. Various strategies may be combined and/or made contingent based upon updated information at any time.

Proxy Service

A proxy service PS implemented at a high performance computing device/server 120 is configured to receive client messages and performing initial decompression, processing, and translation of such messages. In addition, the proxy service PS facilitates routing of trades as appropriate, depending upon the type of trade to be executed.

The high performance server (proxy server) 120 is co-located and in high speed communication with a Hardware Platform (HP) 130 via a direct physical connection such as provided via a local network LN. Further, the high performance server 120 and hardware platform 130 are also located as close as possible to one or equities exchanges 140, wherein the hardware platform 130 is coupled to the equities exchanges 140 (illustratively equities exchanges 140-1 through 140-3) via high-speed/high priority communications links/channels (illustratively, priority links/channels P1 through P3).

The Proxy Service PS stores all configuration details for the trader including configured strategies, algorithms for determining exit and stop loss prices, and which stocks are currently being monitored. It will use the configuration details in combination with the received order to determine the next course of action. The proxy service PS acts as a facilitator for requests traveling over the first communications channel 110 to and from the client, and will convert incoming orders to a lower-layer protocol to forward them to the Hardware Platform for rapid, hardware-based assessment and execution.

The HP 130 is configured to examine incoming orders, compare them to near-real time price and order-book (level 2) data, and rapidly evaluate trades against the client's configured execution profile (e.g., profile data indicative of trading strategy, risk tolerance, preferential equities, execution sequencing, trade/execution conflict resolution and the like) with minimal latency in order to improve decision-making with rapid analysis based on more current information.

As depicted in FIG. 1, the system 100 comprises various client interface host devices 105 communicating with a proxy service 120 and co-located hardware platform 130, which in turn communicate with one or more equities exchanges 140. However, in various embodiments a single proxy service 120 and co-located hardware platform 130 is used for each of the equities exchanges 140, such as where proximate location with multiple equity exchanges or their data servers is not feasible. Further, since different equities exchanges 140 may be associated with different groups of trading equities of interest, trading strategies associated with a diverse portfolio may benefit from trading via multiple equities exchanges 140.

FIG. 1 also depicts an optional broker 150 in communication with the proxy service 120/hardware platform 130. Generally speaking, the broker 150 comprises an entity tasked with non-urgent trades and/or trades which, for various reasons, are not appropriate for execution via the hardware platform 130. The broker 150 will be discussed in more detail below with respect to FIGS. 2-3.

FIG. 1 also depicts an optional network services manager 160 in communication with the network 110. Generally speaking, the network services manager 160 operates to manage various aspects of the network 110, including provisioning of network services supported by the network 110. In various embodiments, the network services manager 160 operates to fulfill various Infrastructure as a Service (IaaS) offerings by provisioning specific communication channels between client devices 105 and proxy servers 120. The network services manager 160 will be discussed in more detail below with respect to FIG. 4.

Figure 2:
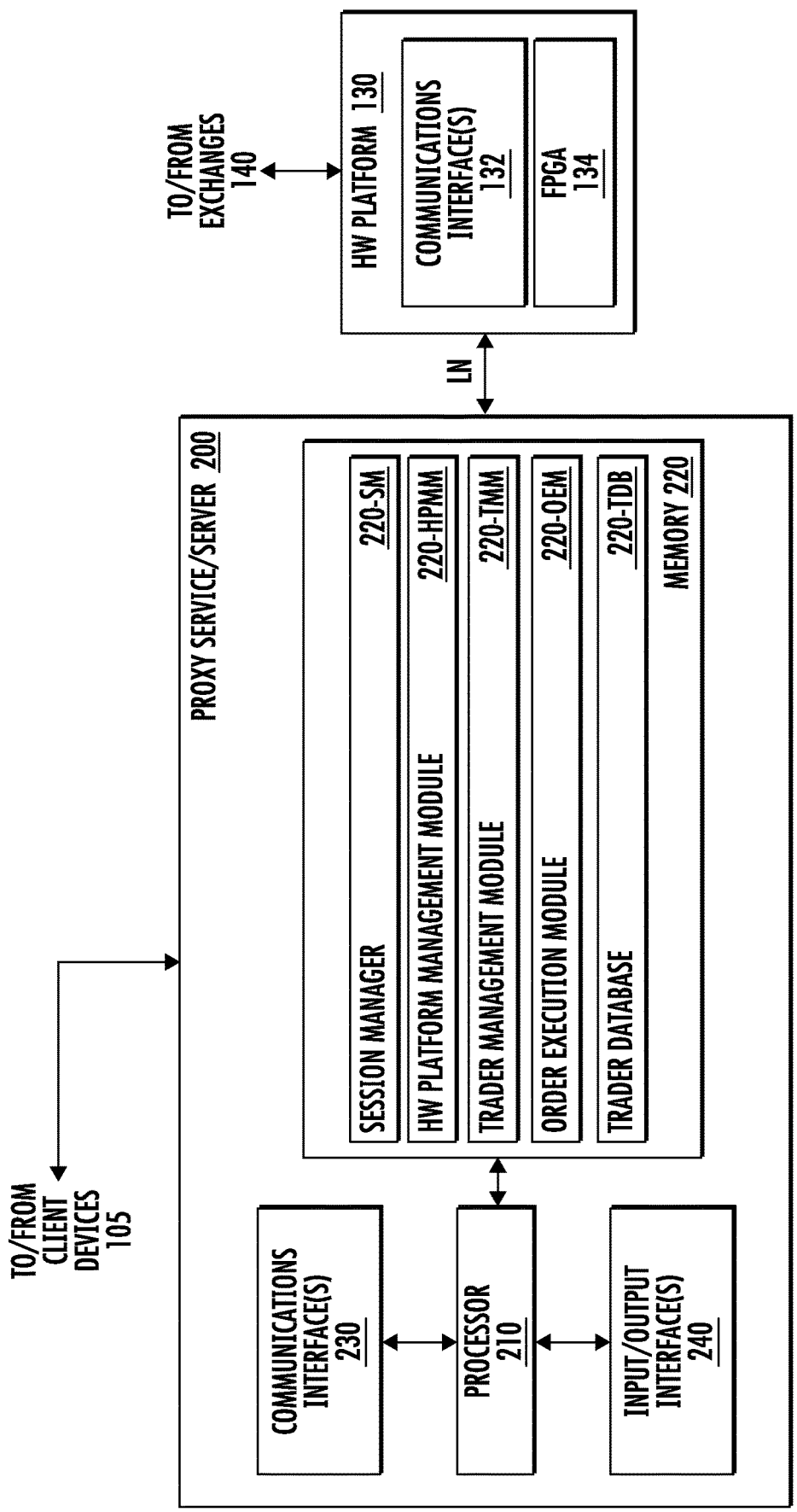
FIG. 2 depicts a high-level block diagram of a computing device configured for implementing a proxy service function according to one embodiment.

FIG. 2 depicts a high-level block diagram of a computing device configured for implementing a proxy service function according to one embodiment and suitable for use in performing the various functions as described herein. It will be appreciated that the proxy service function 200 described herein with respect to FIG. 2 may be used within the system 100 of FIG. 1; namely, as the proxy service 120 located proximate the hardware platform 130.

As depicted in FIG. 2, computing device 200 may be implemented using a web server, computer server and/or other computing device. The depicted device 200 includes a processor element 210 (e.g., a central processing unit (CPU) or other suitable processor(s)), a memory 220 (e.g., random access memory (RAM), read only memory (ROM), and the like), a communications interface 230 (e.g., one or more interfaces enabling communications via the first communications network 100 and local network LN), and an optional input/output interface 240 (e.g., GUI delivery mechanism, user input reception mechanism, web portal interacting with remote workstations and so on).

It will be appreciated that computing device 200 depicted in FIG. 2 provides a general architecture and functionality suitable for implementing proxy service functional elements described herein or portions thereof.

It will be appreciated that the functions depicted and described herein may be implemented in hardware or in a combination of software and hardware, e.g., using a general purpose computer, one or more application specific integrated circuits (ASIC), or any other hardware equivalents. In one embodiment, computer instructions are loaded into memory 220 and executed by processor 210 to implement the functions as discussed herein. The various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

The communications interface 230 facilitates communications with the client host interface devices 105 via the network 110, illustratively a first communications network such as previously described. The communications interface 230 also facilitates communications with the hardware platform 130 via the local network LN, illustratively a high-speed local network configured for communications between proximately located devices (e.g., the proxy service/server 130/200 and the hardware platform 130). In various embodiments, a first communications interface 230 is used for communicating with the first communications network, and a second communications interface 230 is used for communicating with the second communications network.

In various embodiments the first communications network 110 comprises a standard communications network. In other embodiments the first communications network 110 comprises a priority communications network, such as a low-latency, high QoS/high priority channel through a standard communications network. In various embodiments, multiple priority mechanisms are employed in as many network segments as possible to reduce latency of information transmitted via what is discussed herein as the first communications network 110. Thus, various embodiments utilize premium or priority channels within a service provider network, wherein communications supported by such premium or priority channels within the service provider network are prioritized over other network traffic by using, illustratively, virtual private network (VPN) tags, 5G NR Standardized QoS Identifier (5GQI) to QoS Characteristics Mapping for 5G URLLC, Service Identifiers (SIDs) for Data Over Cable Service Interface Specification (DOCSIS), Differentiated Services Code Point (DSCP) packet classification and the like.

The memory 220 is depicted as storing computer instructions executable by the processor 210 to implement various functions associated with the proxy service 130/200, such as a session manager 220-SM, a hardware platform management module 220-HPCM, a trader management module 220-TCM, an order execution module 220-OEM, a trader database 220-TDB and various other programs and databases (not shown)

The session manager 220-SM is configured to manage network services sessions associated with the client interface host devices 105, such as for transmitting data back and forth in a secure manner, authentication, authorization and so on. In various embodiments, the session manager 220-SM is used in conjunction with a remote services manager configured to invoke trading management and control sessions with various subscribers. The session manager 220-SM supports the various client interface functions implemented via the client interface host devices 105. Various embodiments utilize client-server communication operating in a stateless manner where security is provided via an authentication token or other means (i.e., there is no session manager required).

The hardware platform management module 220-HPMM is configured to manage the programming information associated with the hardware platform to enable thereby rapid trade executions and related decision-making.

The trader management module 220-TMM is configured manage trader information associated with various equities of interest, strategies of interest, algorithms of interest and the like. Generally speaking, the trader management module 220-TCM is configured to identify the specific criteria of one or more trade execution strategies of interest and the mechanisms by which such strategies are implemented by the hardware platform 130.

Various strategy configurations involve defining intended stop-loss prices and exit prices as a function of the total transaction value and any number of relevant technical indicators. To aid the system in determining these prices, in various embodiments the Proxy Service 120 expresses the functions as simple multipliers, thereby limiting the required number of inputs to the hardware platform 130 and allowing it to determine the concrete price targets by applying a straightforward product operation to the total transaction value.

It is noted that certain types of orders will require interaction with an external broker. This may be necessary due to, illustratively, the short selling on equity which necessarily requires that the shares to be sold are first "borrowed" from some outside source, thereby resulting in a negative or "short" position with regard to that equity.

The order execution module 220-OEM is configured to automatically or semi-autonomously enable or inhibit the execution of a trade generated by the hardware platform 130. Specifically, in various embodiments the hardware platform 130 is configured in accordance with the strategies, algorithms, monitored equities (e.g., via one or equities exchanges 140) such that trading opportunities identified thereby are substantially instantaneously executable, wherein execution of such trades may be executed immediately, executed in accordance with further decision information stored at the proxy service/server 200, and/or executed in accordance with a final command from a client interface host device 105. The order execution module 220-OEM provides a control signal or message to the hardware platform 130 configured to cause the hardware platform 130 to execute or not execute a particular trade when the hardware platform 130 determines that a trading point has been reached for the particular trade.

The trader database 220-TDB is configured to store any data associated with the various functions described herein.

Thus, the various functions, methodologies, databases or portions thereof (including associated data structures) may be stored on a computer readable storage medium (e.g., RAM memory, magnetic or optical drives and the like) from which they may be retrieved and executed/implemented.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible and non-transitory computer readable medium such as fixed or removable media or memory, transmitted via a tangible or intangible data stream in a broadcast or other signal bearing medium, and/or stored within a memory within a computing device operating according to the instructions.

Client Interface Functions

The client interface functions may include establishing a "watch list" of equities and/or other tradable securities or derivatives thereof. For example, client interface enables a trader to configure a "watch list" of equities or other tradable securities or derivatives thereof, such as on a regular basis (e.g., daily, weekly etc.). The watch list provides various advantages to the trader, including:

(1) Limiting the number of equities or other financial instruments which are displayed in the user interface. Specifically, by maintaining a relatively short list of "stocks in-play" the resulting decision-making process is simplified and the problem space associated with the various determinations made in the different embodiments is reduced. Further, individual equities may be processed in the various embodiments using the most current price data possible, as well as various other configured technical indicators useful in deciding what, when, and how much to trade.

(2) Keeping the world of tradable instruments small allows the user to match pre-configured shortcuts to strategies and equities which have been defined ahead of time. Using shortcuts will allow orders to be entered at a moment's notice, minimizing the time required between the decision to place an order and the entry of the order into the client system.

(3) Configuring a limited set of financial instruments to track allows the Proxy Service and Hardware Platform to limit the scope of their input data and processing. This will allow these systems to be better prepared for an order before it's received from the client, reducing the time to order execution.

(4) Configuring a limited set of financial instruments to track allows the system to send application-layer messages with the smallest possible size, further reducing latency.

It is noted that day traders typically trade using their own limited set of trading strategies. In addition to configuring a daily watch list, the trader will use the client interface to define a set of commonly used strategies for profiting from a defined sequence of trades. These strategies will help to define the price levels at which the trader intends to exit their position in order to minimize losses (stop loss) or to take profits (exit target). The client interface will provide a means to specify these price levels as a function of the total transaction price and the strategy in play, which will ultimately be calculated by the Hardware Platform in order to inform the system's decision making.

The various embodiments provide a system and communications architecture or topology in which differing priorities of communications are used to facilitate messages and execution orders having different critical time frames.

In particular, various embodiments utilize a first communications channel (i.e., network 110) is used to support messaging back and forth between client devices 105 and the computing device 120 such that the proxy service PS invoked thereon may be configured in accordance with the various watch list, strategies, algorithms and/or other decision-tree parameters of interest to a particular trader. A higher priority second communications channel (i.e., a local network LN) physically connecting the computing device 120 and hardware platform 130 enables direct control of the hardware platform 130 by the proxy service PS executed at the computing device 120 such that configuration changes may be made to the hardware platform 130, proposed trades may be executed rapidly in an autonomous or semiautonomous manner and so on. Finally, a top priority third communications channel (i.e., a direct optical or electrical connected network) between the federal platform 130 and equities exchanges 140 enables the harder platform 130 to receive near-instantaneous equity/instrument pricing information and, after determining that a trade should be executed, route a corresponding trade execution order to the appropriate equities exchange 140 in an extremely low latency manner.

The various embodiments further provide a system and communications architecture or topology in which speed of analysis/execution is further improved by the use of message encoding mechanisms and action/execution shortcut mechanisms.

Client Request Processing Functions

The proxy service PS is configured to process client requests and, for those requests intended to be executed by the hardware platform 130, translate those requests into a lower-level message suitable for use by the hardware platform 130 or other circuitry associated with the hardware platform 130. The translated requested and forwarded to the hardware platform 130 via the local network LN.

For example, upon receiving a client request, the proxy service PS may perform a lookup in a stored watchlist table to convert the incoming request from a shortened alias to a financial instrument identifier, determine the currently held position with respect to a target financial instrument(s) specified in the client request, determine an appropriate type of order to be processed via the hardware platform 130, and translate that order into a lower-level message to be fed to the hardware platform 130 inputs (or other hardware inputs) of hardware platform 130. A received client request may comprise an order message including the following values: (1) Stock Symbol; (2) Order Type; (3) Number of Shares; (4) Exit Target Multiplier; and (5) Stop Loss Multiplier.

Hardware Platform

In various embodiments, the programmable-logic-based Hardware Platform 130 receives input from two separate types of sources. The first source of inputs comes from a physical bus connection to the server hosting the Proxy Service. This connection will serve as the means by which order requests originating with the client are communicated to the Platform.

The Hardware Platform 130 examines incoming orders, compares them to near-real time price and order-book data, and then evaluates various trades against the client's configured strategies. Using predictive analytics in accordance with the various trader strategies, risk tolerances and so on, the order or platform 130 determines whether a trade is worthwhile and, if so, enters a corresponding order with an exchange with a view toward automatically exiting the position at a later time based upon a configured transaction strategy defined by the proxy service PS.

The second of these inputs is a direct level 2 data connection to data feeds from one or more financial exchanges. This data will influence the system's behavior by allowing it to consider expected returns alongside real-time predictive analysis using the most current information.

Data can be exchanged between the Hardware Platform 130 and the exchanges 140 via any low-level protocol (e.g., FIX, CSM, or CMi2) the exchange prefers, with preferences giving toward the protocol that produces the lowest latency.

In addition to executing or discarding orders as they come in, the Hardware Platform 130 will continuously monitor the exchange data feed in order to act on the calculated stop loss or exit targets as quickly as possible. Not only does this drastically reduce the time to execution for stop loss and exit orders, but it rigidly enforces execution of the transaction strategy as defined by the trader, perhaps preventing emotional mistakes. Of course, the system should also allow mid-trade adjustments based on new information and updated predictions.

Figure 3:
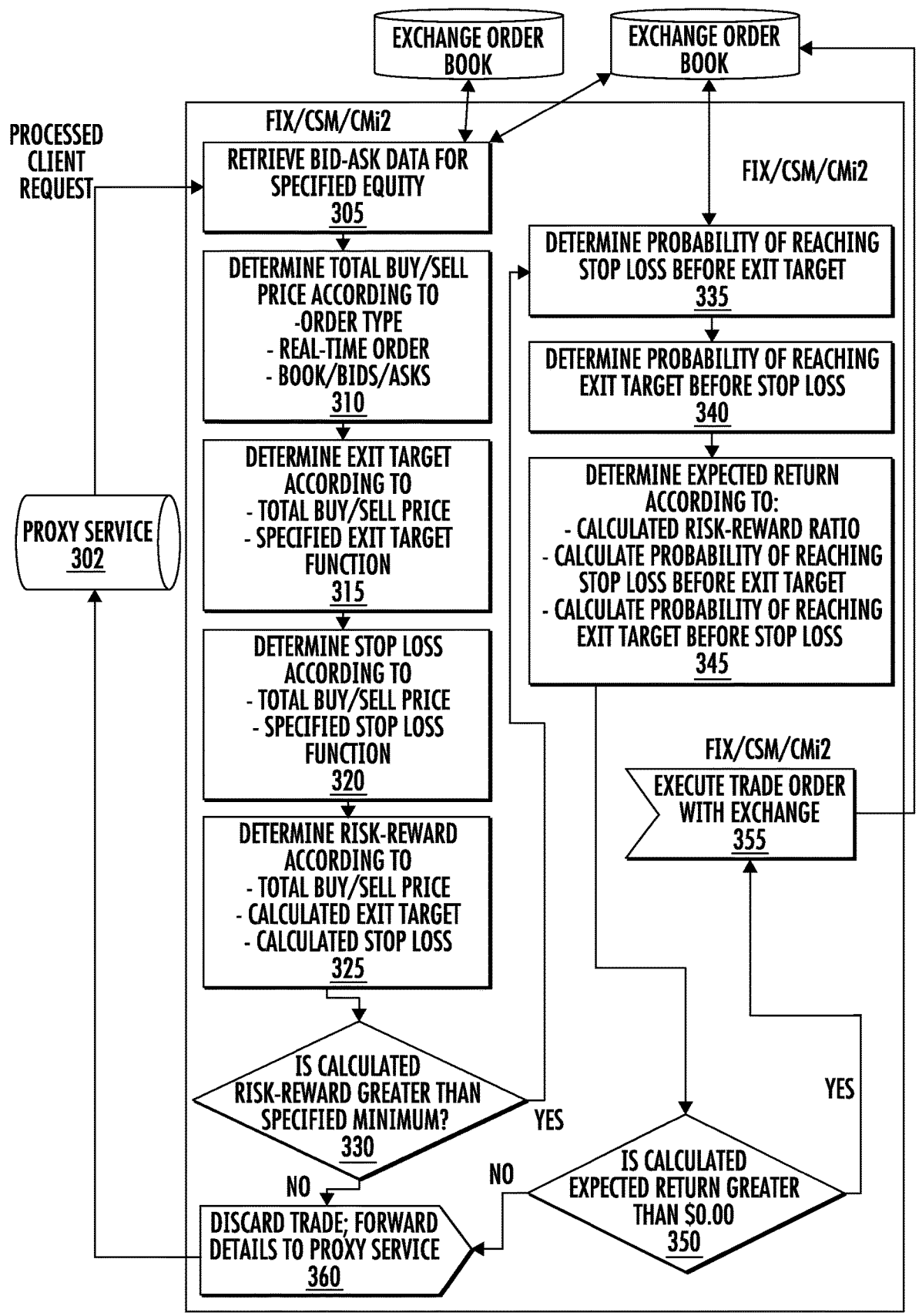
FIG. 3 depicts a flow diagram of a method according to an embodiment.

FIG. 3 depicts a flow diagram of a method according to an embodiment. Specifically, the method 300 of FIG. 3 is primarily executed at the hardware platform 130 in accordance with a configuration of the hardware platform 130 by the proxy service PS.

At step 302, a processed client request is forwarded to the hardware platform 130 via the local network LN.

At step 305, bid-ask data for a specified equity is retrieved from an exchange orderbook associated with one or more relevant equity exchanges 140.

At step 310, a total buy/sell price is determined according to order type and real-time orderbook bid/ask data. That is, when the hardware platform 130 is provided with an order request, it calculates the total expected dollar value of the transaction according to the order type and current level 2 data for the instrument in question.

At step 315, and exit target for the position is determined according to total buy/sell price and a specified exit target function. At step 320, a stop loss is determined according to a total buy/sell price and the specified stop loss function. That is, the hardware platform determines the stop-loss and exit target prices according to the multipliers provided by the Proxy Service.

At step 325, a risk-to-reward ratio (rrr) is determined for the order type according to total buy/sell price, calculated exit target and calculated stop loss. For example, the risk-to-reward ratio (rrr) may be determined in accordance with the following equation (wherein the precise form of the expression depends upon whether or not the order describes a short sale):

$$\text{For long positions: } rrr = \frac{(\text{exit price} - \text{average transaction price per share})}{(\text{average transaction price per share} - \text{stop loss price})}$$

$$\text{For long positions: } rrr = \frac{(\text{average transaction price per share} - \text{exit price})}{(\text{stop loss price} - \text{average transaction price per share})}$$

At step 330, a determination is made as to whether the calculated risk-to-reward ratio exceeds a specified minimum or threshold level rrr. If the rrr for the received order satisfies the minimum requirements previously configured, then the method proceeds to step 335. Otherwise, the method 300 proceeds to step 360 where the trade is discarded and the details of the discarded trader forwarded to the proxy service PS.

At step 335, the probability of reaching a stop-loss price before reaching an exit target price is determined, and at step 340 the probability of reaching an exit target before a stop-loss price is determined.

At step 345, a determination of the expected return is made according to the calculated risk-reward ratio (rrr), the calculated probability of reaching a stop-loss price before an exit target price, the calculated probability of reaching an exit target price before a stop-loss price, and the total transaction value ttv (i.e., ttv=the average price per share*number of shares purchased or shorted). That is, a determination is made as to whether a particular trade is worthwhile in terms of an expected return (ER), such as in accordance with the following equation:

$$ER = \frac{(rrr * \text{probability of reaching exit target price before stop loss} * ttv)}{(\text{probability of reaching stop loss before exit target price})} - ttv$$

At step 350, a determination is made as to whether the expected return is greater than zero. If the expected return is not greater than zero, then the method 300 proceeds to step 360 where the trade is discarded and the details of the discarded trader forwarded to the proxy service PS. If the expected return is greater than zero, then the method 300 proceeds to step 355 where the trade order is executed with the relevant exchange.

Infrastructure as a Service (IaaS)

In various embodiments, the network services manager 160 operates to fulfill various Infrastructure as a Service (IaaS) offerings of a network or communications services provider by provisioning specific communication channels between client devices 105 and proxy servers 120. It is noted that the network services manager 160 may be implemented as a general purpose computing device such as a server or other computing device comprising processing, memory and input/output components such as broadly described with respect to the proxy server 120.

In particular, IaaS offerings may include various tiers of service associated with communication channels between client devices 105 and one or proxy servers 120, where lower latency communication channels are preferable for incrementing the various embodiments described herein.

Figure 4:
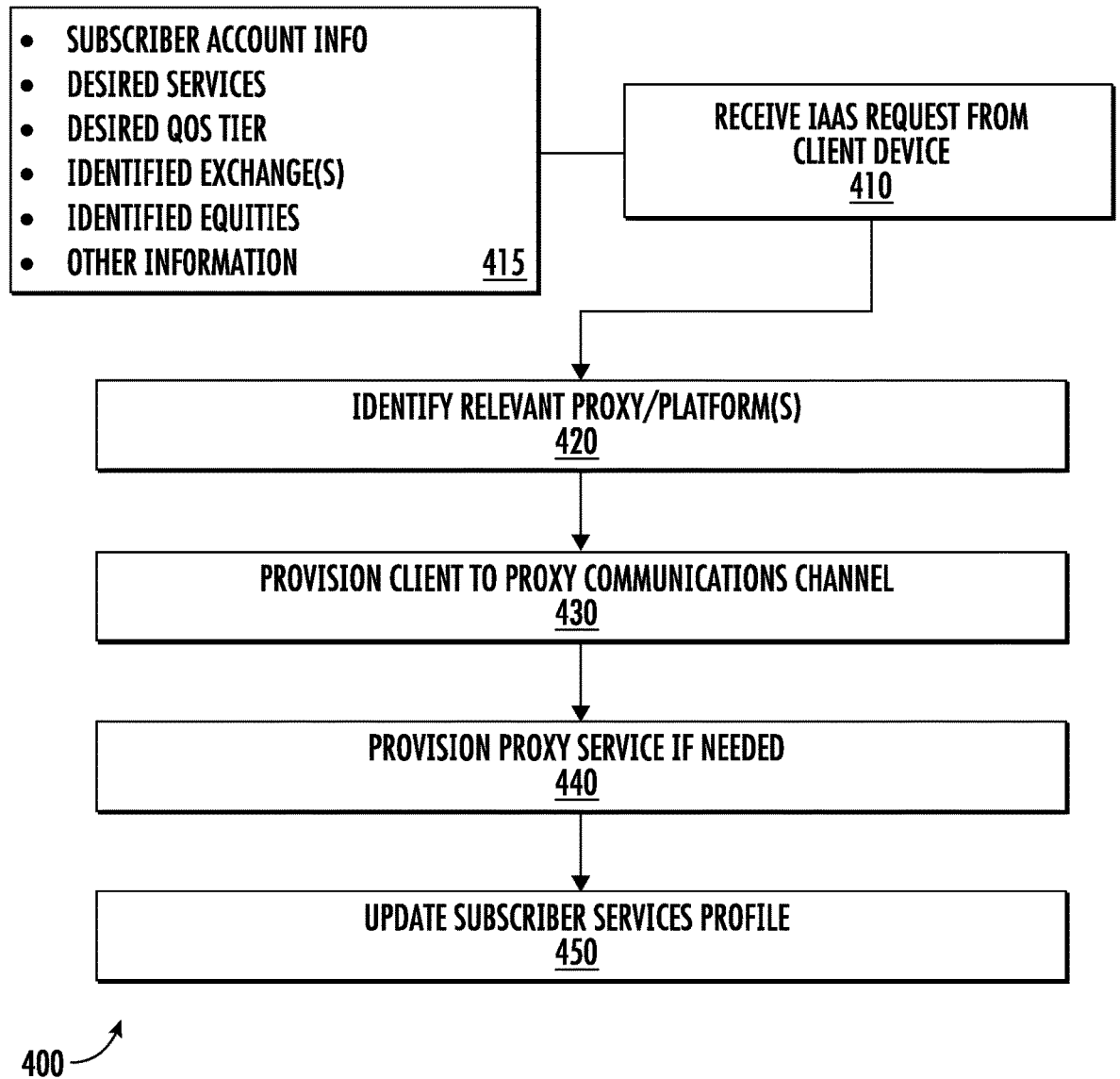
FIG. 4 depicts a flow diagram of a method according to an embodiment.

FIG. 4 depicts a flow diagram of a method according to an embodiment. Specifically, the method 400 of FIG. 4 is primarily executed at the network services manager 160 or other provider equipment (PE) associated with the network 110 to provision network services associated with at least one first communications channel and respective proxy server 120/hardware platform 130, or associated with a request for low-latency access request to one or more equities exchanges 140.

At step 410, the network services manager 160 receives an Infrastructure as a Service (IaaS) request from a client device 105. Referring to box or 15, the request includes subscriber account information and an indication of desired services; namely, access to a low latency or high-priority communications channel/link between a subscriber device 105 and one or more relevant proxy servers 120/hardware platforms 130. Optionally, the request may identify a desired quality of service (QoS) tier (e.g., differing QoS tiers being associated with respective guaranteed speed, latency, uptime and the like), one or desired equities exchanges, one or equities of interest, and/or other information.

At step 420, one or relevant server proxies 120/hardware platforms 130 are identified in response to the IaaS request information. For example, the request may identify a specific server proxies 120/hardware platforms 130, the request may identify one or more exchanges which may then be associated with corresponding server proxies 120/hardware platforms 130, the request may identify one or equities which are handled by certain exchanges, which exchanges may then be associated with corresponding server proxies 120/hardware platforms 130 and so on.

At step 430, one or more IaaS communication channels are provisioned for the requesting subscriber in accordance with the identified server proxies 120/hardware platforms 130 to enable thereby the IaaS support for the various embodiments described above. That is, the network services manager 160 provisions low latency communications channels within the network 110 as requested by the client device 105.

At step 440, if needed, one or more server proxies 120/hardware platforms 130 are provisioned to enable thereby the IaaS support for the various embodiments described above. That is, the network services manager 160 provisions any necessary provider equipment managed by the network services manager 160 to implement the server proxy 120/hardware platform 130 functions as requested by the client device 105.

At step 450, the subscriber service profiles updated to include relevant provisioning, accounting, and other service provider tasks.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A low-latency trade execution system, comprising:
   a proxy service, configured to receive client messages from remote client devices via a first communications channel, and to responsively establish therefrom one or more trade execution profiles, each trade execution profile defining for a trading equity of interest a respective trading strategy and corresponding trigger conditions therefore, and to generate hardware platform programming data representative of the trade execution profile;
   a hardware platform, co-located and directly communicating with the proxy service via a second communications channel, and configured to communicate with at least one equity exchange via a third communications channel, the second communications channel having a higher priority than the first communications channel, the third communications channel having a higher priority than the second communications channel;
   wherein operation of the hardware platform is defined in accordance with hardware platform programming data received from the proxy service and stored at the hardware platform;
   wherein, in response to receiving a trade request from a client device via the proxy service, the hardware platform evaluates the trade request in accordance with corresponding stored hardware platform programming data using pricing data received from the at least one equity exchange; and
   wherein the hardware platform executes the requested trade if the evaluation indicates a greater than zero expected return.

2. The low-latency trade execution system of claim 1, wherein the trade request comprises a message including an encoded payload configured to reduce an amount of data to be transported by the first communications channel.

3. The low-latency trade execution system of claim 2, wherein the encoded payload includes indicators associated with a transaction strategy configured at the hardware platform via the hardware platform programming data.

4. The low-latency trade execution system of claim 1, wherein the hardware platform comprises one of a field programmable gate array (FPGA), an application-specific integrated circuit (ASIC), and a Complex Programmable Logic Devices (CPLD).

5. The low-latency trade execution system of claim 1, further comprising provider equipment (PE) associated with network services manager configured to manage a network supporting the first communications channel, and to provision the first communications channel for a subscriber in response to a subscriber request.

6. The low-latency trade execution system of claim 5, wherein the first communications channel comprises a communications channel having a requested Quality of Service (QOS) tier.

7. The low-latency trade execution system of claim 5, wherein the subscriber request comprises an Infrastructure as a Service (IaaS) request.

8. The low-latency trade execution system of claim 5, wherein the subscriber request defines a proxy service/hardware platform of interest, said first communications channel being configured to operably connect said client device to said proxy service/hardware platform of interest.

9. The low-latency trade execution system of claim 5, wherein the subscriber request defines an equities exchange of interest, said first communications channel being configured to operably connect said client device to a proxy service/hardware platform proximate said equities exchange of interest.

10. The low-latency trade execution system of claim 5, wherein the network services manager is further configured to provision a proxy service/hardware platform of interest in response to the subscriber request.

11. The low-latency trade execution system of claim 1, wherein hardware platform programming instructions use reduced complexity mathematical instructions to limit thereby a number of active inputs thereto.

12. A low-latency trade execution method, comprising:
    receiving, at a proxy service via a first communications channel, client messages from at least one remote client device for defining a trade execution profile, each trade execution profile defining for a trading equity of interest a respective trading strategy and corresponding trigger conditions therefore;
    generating, at the proxy service for each trade execution profile, respective hardware platform programming data representative of the trade execution profile;
    transmitting, from the proxy service via a second communications channel to a hardware platform co-located with the proxy service, the generated hardware platform programming data representative of the trade execution profile; and
    the proxy service, in response to receiving a trade request from a client device via the first communications channel, sending a command to the hardware platform configured to cause the hardware platform to evaluate the trade request in accordance with the hardware platform programming data using pricing data received from at least one equity exchange in communication with the hardware platform via a third communications channel, the hardware platform being further configured to execute the requested trade if the evaluation indicates a greater than zero expected return;

wherein the second communications channel having a higher priority than the first communications channel, and the third communications channel having a higher priority than the second communications channel.

13. The low-latency trade execution method of claim 12, wherein the trade request comprises a message including an encoded payload configured to reduce an amount of data to be transported by the first communications channel.

14. The low-latency trade execution method of claim 13, wherein the encoded payload includes indicators associated with a transaction strategy configured at the hardware platform via the hardware platform programming data.

15. The low-latency trade execution method of claim 12, further comprising:
   receiving, at provider equipment (PE) associated with network services manager configured to manage a network supporting the first communications channel, a subscriber request to provision the first communications channel; and
   provisioning the first communications channel for the subscriber at a requested Quality of Service (QOS) tier.

16. The low-latency trade execution method of claim 15, wherein the subscriber request defines a proxy service/hardware platform of interest, and the first communications channel is configured to operably connect a client device of the subscriber to said proxy service/hardware platform of interest.

17. The low-latency trade execution method of claim 15, wherein the subscriber request defines an equities exchange of interest, and the first communications channel is configured to operably connect a client device of the subscriber to a proxy service/hardware platform proximate said equities exchange of interest.

18. The low-latency trade execution method of claim 15, wherein the network services manager is further configured to provision a proxy service/hardware platform of interest in response to the subscriber request.

19. A communications system, comprising:
   a proxy service, configured to receive client messages from remote client devices via a first communications channel, and to responsively establish therefrom one or more trade execution profiles, each trade execution profile defining for a trading equity of interest a respective trading strategy and corresponding trigger conditions therefore, and to generate hardware platform programming data representative of the trade execution profile;
   a hardware platform, co-located and directly communicating with the proxy service via a second communications channel, and configured to communicate with at least one equity exchange via a third communications channel, the second communications channel having a higher priority than the first communications channel, the third communications channel having a higher priority than the second communications channel;
   a network services manager, configured to manage a network including provider equipment supporting the first communications channel and, in response to a subscriber request, to provision the first communications channel at a requested Quality of Service (QOS) tier;
   wherein operation of the hardware platform is defined in accordance with hardware platform programming data received from the proxy service and stored at the hardware platform;
   wherein, in response to receiving a trade request from a client device via the proxy service, the hardware platform evaluates the trade request in accordance with corresponding stored hardware platform programming data using pricing data received from the at least one equity exchange; and
   wherein the hardware platform executes the requested trade if the evaluation indicates a greater than zero expected return.

20. The communications system of claim 19, wherein the network services manager is further configured to provision a proxy service/hardware platform of interest in response to the subscriber request.

* * * * *